March 21, 1933. M. O. FREDRICKSON 1,902,551
WEDGE REMOVING TOOL FOR ELECTRIC MOTORS AND GENERATORS
Filed March 23, 1932
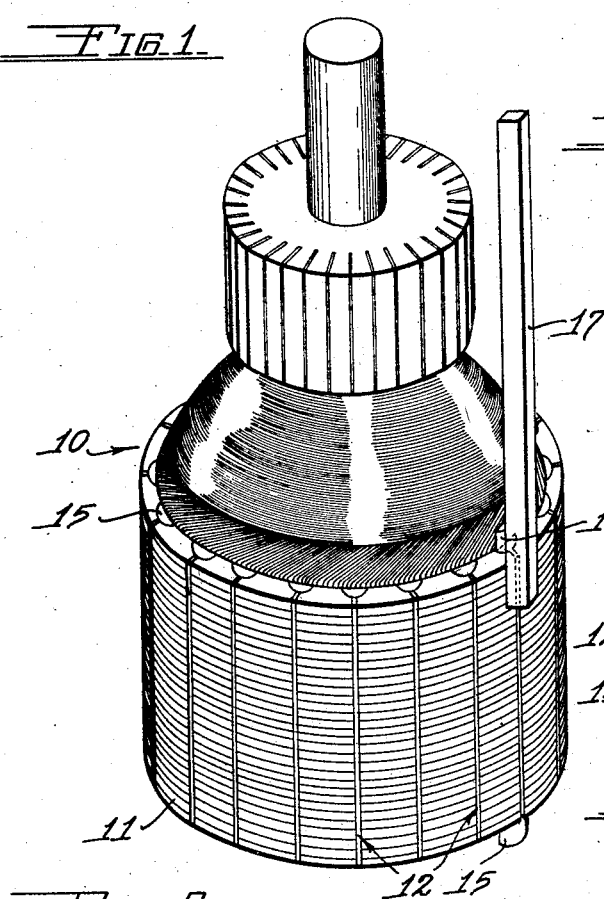
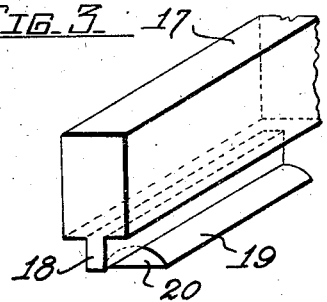
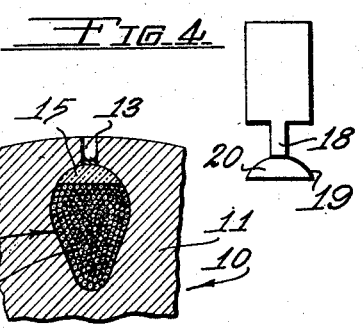
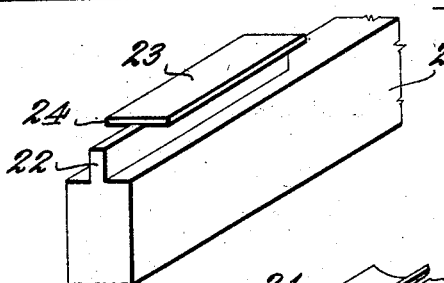
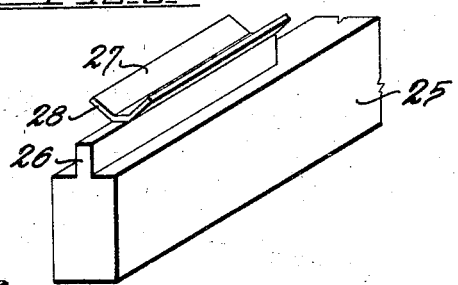
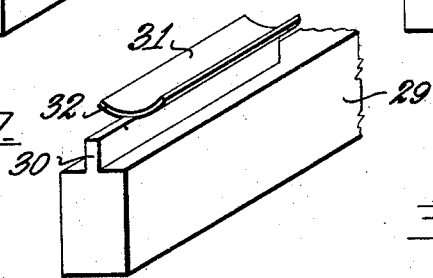
INVENTOR
M. O. FREDRICKSON
BY Hazard and Miller
ATTORNEYS Patented Mar. 21, 1933

1,902,551

UNITED STATES PATENT OFFICE

MILTON O. FREDRICKSON, OF SAN PEDRO, CALIFORNIA

WEDGE REMOVING TOOL FOR ELECTRIC MOTORS AND GENERATORS

Application filed March 23, 1932. Serial No. 600,689.

This invention relates to a device for driving and removing wedges from cores of electric motors, electric generators, and similar electric apparatus. In the conventional construction of electric motors and electric generators there is a laminated body which may be the body of the rotor, or the body of the stator, or both. The laminated body has transverse winding slots formed therein, each slot having a relatively narrow slot opening. In assembling the construction the windings are inserted in the slots through the slot openings and after the windings have been applied wedges are driven into the slots immediately behind the slot openings to lock the windings in place. These wedges are frequently formed of wood, fibre, or similar material, and after they have been positioned the structure is coated with a suitable insulating varnish or the like. Whenever it becomes necessary to repair or replace a winding, the wedges must first be removed. Heretofore attempts have been made to drive the wedges out of the slots with screwdrivers and similar implements but because of the fact that the wedges can be easily broken considerable difficulty has been experienced in removing the wedges in this manner.

An object of the present invention is to provide a relatively simple, durable and inexpensive tool, which will enable the wedges to be easily and quickly driven out of the slots without a great deal of difficulty or danger of breaking the wedges.

With the foregoing and other objects in view, which will be made manifest in the following detailed description, and specifically pointed out in the appended claims, reference is had to the accompanying drawing for an illustrative embodiment of the invention, wherein:

Fig. 1 is a perspective view of a rotor illustrating the improved tool in applied position.

Fig. 2 is a partial view in section illustrating a slot in the rotor.

Fig. 3 is a perspective view illustrating one form of tool designed to be used on a piece of electrical equipment having a winding slot of the configuration illustrated in Figure 2.

Fig. 4 is a view in end elevation of the same.

Figs. 5, 6 and 7, are perspective views illustrating modifications.

Referring to the accompanying drawing, wherein similar reference characters designate similar parts throughout, I have illustrated the tool as being used upon a suitable rotor generally designated at 10. It will be understood, however, that the tool can be used equally well on the stator or any form of electrical apparatus employing windings disposed within slots. The body of the rotor 10 is shown as being made up of laminations 11 in which there are formed transverse winding slots generally designated at 12. Each slot has a relatively narrow slot opening indicated at 13 on Figure 2, and the inner end of the slot is enlarged to receive the windings 14. The conventional practice is to insert a wedge 15 extending the complete length of the slot which is disposed between the winding and the slot opening 13 to lock the winding in place. It not infrequently occurs that the end of the wedge projects beyond the side of the laminated body. In order to remove this wedge for purposes of replacement or repair of the windings, I have provided a tool comprising a handle 17, preferably formed of steel or equivalent material, the length of which may vary but which preferably is at least as long as if not longer than the width of the laminations at 11 so as to be capable of being driven the complete length of the slot. At one end of this handle there is formed a laterally extending web 18 designed to enter the slot opening and pass freely therethrough. The outer edge of the web carries an enlargement indicated at 19, the forward edge of which presents a driving end 20 arranged perpendicularly to the length of the handle 17. The driving end 20 of the enlargement is preferably arranged behind the forward edge of web 18. The enlargement is given a configuration corresponding to the configuration of wedge 15, that is it conforms to the interior of the slot immediately behind the slot opening. In using the tool web 18 is positioned with its forward end in slot opening 13, in which case the driving end 20 is positioned opposite the end of wedge 15. Driving end 20 is preferably designed to cover the end of the wedge practically entirely. The end of the handle can then be driven with the result that the web 18 enters the slot opening and at the same time driving end 20 pounds out the wedge. The wedge will thus be driven without danger of breaking it and the enlargement 19 is effectively guided by the web 18. In the event that the wedge 15 projects beyond the end of the slot by having the driving end 20 disposed behind the leading edge of web 18, the web can be positioned opposite the end of the slot or caused to enter it before the enlargement 19 engages the projecting end of the wedge. In this manner the tool is caused to enter the slot opening so as to be guided thereby simultaneously with or prior to the engagement between enlargement 19 and the wedge.

Not all slots have the configuration shown in Figure 2 nor do the wedges have the configuration indicated at 15. Some slots are differently designed requiring wedges of different shapes. To take care of these instances I have illustrated in Figures 5, 6 and 7, slight modifications. In Figure 5 the handle is indicated at 21 having the web 22 corresponding to the web 18. The enlargement instead of being of a cross sectional shape corresponding to the segment of a circle is of a cross sectional shape of a thin rectangle. This enlargement is indicated at 23 providing laterally extending flanges on the edge of the web 22. Its driving end is indicated at 24 and is disposed behind the leading edge of web 22. In Figure 6 the handle is indicated at 25 having the web 26 and the enlargement 27 in this case is of angular cross section designed to conform to an angular wedge. Its driving end 28 is likewise disposed behind the leading edge of web 26. In Figure 7 the handle is indicated at 29 and the web at 30. The enlargement 31 has a cross sectional shape which is comparatively thin and which is curved as shown. Its driving end 32 is disposed behind the leading edge of web 30. These shapes illustrated in the modifications are designed to conform to different slot shapes and different wedge shapes and it is obvious that enlargements of other cross sectional shape may be substituted therefor where occasion requires.

Various changes may be made in the details of construction without departing from the spirit or scope of the invention as defined by the appended claims.

I claim:
1. A device of the class described comprising a handle, a web adjacent one end of the handle extending laterally therefrom, said web being designed to extend through the slot opening of a winding slot of an electric motor, generator or the like, there being an enlargement at the edge of the web presenting a driving end adapted to engage the end of a wedge in the slot to drive the wedge from the slot.

2. A device of the class described comprising a handle, a web adjacent one end of the handle extending laterally therefrom, said web being designed to extend through the slot opening of a winding slot of an electric motor, generator or the like, there being an enlargement at the edge of the web presenting a driving end adapted to engage the end of a wedge in the slot to drive the wedge from the slot, said enlargement being shaped to conform to the end of the wedge.

3. A device of the class described comprising a handle, a web adjacent one end of the handle extending laterally therefrom, said web being designed to extend through the slot opening of a winding slot of an electric motor, generator or the like, there being an enlargement at the edge of the web presenting a driving end adapted to engage the end of a wedge in the slot to drive the wedge from the slot, said enlargement being shaped to conform to the interior of the slot adjacent the slot opening.

4. A device of the class described comprising a handle, a web adjacent one end of the handle extending laterally therefrom, said web being designed to extend through the slot opening of a winding slot of an electric motor, generator or the like, there being an enlargement at the edge of the web presenting a driving end adapted to engage the end of a wedge in the slot to drive the wedge from the slot, the leading edge of the web being arranged in advance of the driving end of the enlargement.

5. A device of the class described comprising a handle, a web adjacent one end of the handle extending laterally therefrom, said web being designed to extend through the slot opening of a winding slot of an electric motor, generator or the like, said web carrying means providing a driving surface disposed behind the leading edge of the web.

6. A device of the class described comprising a handle, a web adjacent one end of the handle extending laterally therefrom, said web being designed to extend through the slot opening of a winding slot of an electric motor, generator or the like, there being an enlargement at the edge of the web presenting a driving end adapted to engage the end of a wedge in the slot to drive the wedge from the slot, said enlargement being shaped to conform to the end of the wedge, the leading edge of the web being arranged in advance of the driving end of the enlargement.

In testimony whereof I have signed my name to this specification.

MILTON O. FREDRICKSON.